(12) United States Patent
Ramnani et al.

(10) Patent No.: US 10,353,894 B1
(45) Date of Patent: Jul. 16, 2019

(54) SYSTEMS AND METHODS FOR SUBPOPULATION SIZE ESTIMATION AND UNCERTAINTY QUANTIFICATION

(71) Applicants: Manoj Ramnani, McLean, VA (US); James Timothy Oates, Eldersburg, MD (US)

(72) Inventors: Manoj Ramnani, McLean, VA (US); James Timothy Oates, Eldersburg, MD (US)

(*) Notice: Subject to any disclaimer, the term of this patent is extended or adjusted under 35 U.S.C. 154(b) by 496 days.

(21) Appl. No.: 15/256,250

(22) Filed: Sep. 2, 2016

Related U.S. Application Data

(60) Provisional application No. 62/213,128, filed on Sep. 2, 2015.

(51) Int. Cl.
*G06F 17/30* (2006.01)
*G06F 16/2453* (2019.01)
*G06F 16/29* (2019.01)

(52) U.S. Cl.
CPC ........ *G06F 16/24535* (2019.01); *G06F 16/29* (2019.01)

(58) Field of Classification Search
CPC combination set(s) only.
See application file for complete search history.

(56) References Cited

U.S. PATENT DOCUMENTS

2009/0228327 A1* 9/2009 Roy ............... G06Q 30/02
705/14.66

OTHER PUBLICATIONS

Rossi et al. Generalized Linear Models and Capture-Recapture Method in a Closed Population, 2010 (Year: 2010).*

* cited by examiner

*Primary Examiner* — Sherief Badawi
*Assistant Examiner* — Lahcen Ennaji
(74) *Attorney, Agent, or Firm* — Attentive Law Group, PLLC; Paul Ratcliffe

(57) ABSTRACT

A computer implemented method and a subpopulation size estimation and uncertainty quantification system (SE system) for estimating size of a target subpopulation size and quantifying size estimation uncertainty are provided. The SE system constructs an entity database including unique entities mapped to contacts retrieved from a contact database. The SE system receives a query defining target attributes of entities of the target subpopulation from a user device. The SE system estimates size of the target subpopulation delimited by the query by determining a first estimate of the size of the target subpopulation matching the target attributes by performing a mark and recapture estimation, and by determining a second estimate of the size of the target subpopulation matching the target attributes by performing a catch per unit effort estimation. The SE system quantifies the uncertainty of the target subpopulation size obtained from the determined estimates by determining and adjusting variances of the determined estimates.

19 Claims, 14 Drawing Sheets

SYSTEMS AND METHODS FOR SUBPOPULATION SIZE ESTIMATION AND UNCERTAINTY QUANTIFICATION

RELATED PATENT APPLICATION AND PRIORITY

This application claims priority to U.S. Provisional Patent Application 62/213,128 filed Sep. 2, 2015, the content of which is incorporated herein by reference in its entirety.

BACKGROUND

The contact data industry typically sells lists of contacts that match specific criteria, for example, "C-level executives in the Washington, D.C. metropolitan area", "human resources executives in a technology company with more than about 500 employees", etc. However, it is difficult to estimate the number of contacts that would be returned from a list that contains every person in the world who matches the criteria.

Given an arbitrary specification for a list, there is a need for a computer implemented method and system that estimates the number of people who would match the criteria, that is, a target subpopulation, if a provider's contact database had an entry for every person in the world, that is, the population.

Subpopulation size estimates allow list recipients to assess coverage of a list. If a purchased list contains, for example, about 2,000 contacts, but the size of the target subpopulation is 200,000, then another list provider or vendor or alternative methods other than direct electronic mail (email) for reaching a target audience are needed. If the target subpopulation contains, for example, about 2,200 contacts, then the list of about 2000 contacts may be considered adequate. Estimates of subpopulation size also help list providers establish list value. The more complete a list, the more valuable the list is, if the subpopulation is small and hard to reach. The list providers can also focus on collection efforts in subpopulations where coverage is poor.

A conventional method for estimating a composition of a population estimates proportions of a population that, for example, access a web page, where the population has certain demographics such as proportion of a male population versus a female population. However, the sources of information on the demographics of users have biases and there is a need to account for the biases to obtain more accurate estimates of the population composition. Another conventional population estimation method employs a mark and recapture estimation method in the healthcare industry and conducts surveys to actively collect information and identify healthcare professionals with a predefined attribute. Another population estimation method performs probabilistic population size estimation and overlap determination where the number of individuals in a population is estimated when those individuals have multiple distinct properties comprising, for example, cars with different makes, models, years, colors, etc., but no unique identifiers such as license plate numbers. In this method, the input is a database comprising information about the number of times each property is observed. However, the distribution of the individual properties in the population must be known.

Hence, there is a long felt but unresolved need for a computer implemented method and system that estimates a size of a target subpopulation and quantifies size estimation uncertainty.

SUMMARY OF THE INVENTION

The computer implemented method and the subpopulation size estimation and uncertainty quantification system (SSEUQS) (herein characterized as the "SE system") disclosed herein address the above mentioned needs for estimating a size of a target subpopulation and quantifying size estimation uncertainty. Moreover, the computer implemented method and the SE system disclosed herein estimate a number of people who match criteria of a target subpopulation, as if a provider's contact database had an entry for every person in the world population.

The computer implemented method disclosed herein employs the SE system comprising at least one processor configured to execute computer program instructions for estimating the size of the target subpopulation and quantifying size estimation uncertainty. The SE system constructs an entity database comprising unique entities from a contact database. A contact refers to information that one person has about another person in the world. For example, one person may know a current work electronic mail (email) address, a work phone number, a job title, and a company for another person. An entity refers to all of the contact information that one or more persons have about another person in the world. That is, the entity database defines a mapping between each of the unique entities and one or more of multiple contacts retrieved from the contact database. The SE system receives a query defining target attributes of entities of the target subpopulation from a user device. The SE system estimates the size of the target subpopulation delimited by the received query as follows in an embodiment of the invention: The SE system determines a first estimate of the size of the target subpopulation matching the target attributes by performing a mark and recapture estimation using a first predetermined number of disjoint random samples of contacts from the contact database and their corresponding unique entities from the entity database. The SE system also determines a second estimate of the size of the target subpopulation matching the target attributes by performing a catch per unit effort estimation using a second predetermined number of disjoint random samples of contacts from the contact database and their corresponding unique entities from the entity database. The SE system quantifies the uncertainty of the estimation of the size of the target subpopulation obtained from the determined first estimate and the determined second estimate.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Hereinafter, aspects of the invention in accordance with various embodiments will be described. As used herein, any term in the singular may be interpreted to be in the plural, and alternatively, any term in the plural may be interpreted to be in the singular.

Figure 1:
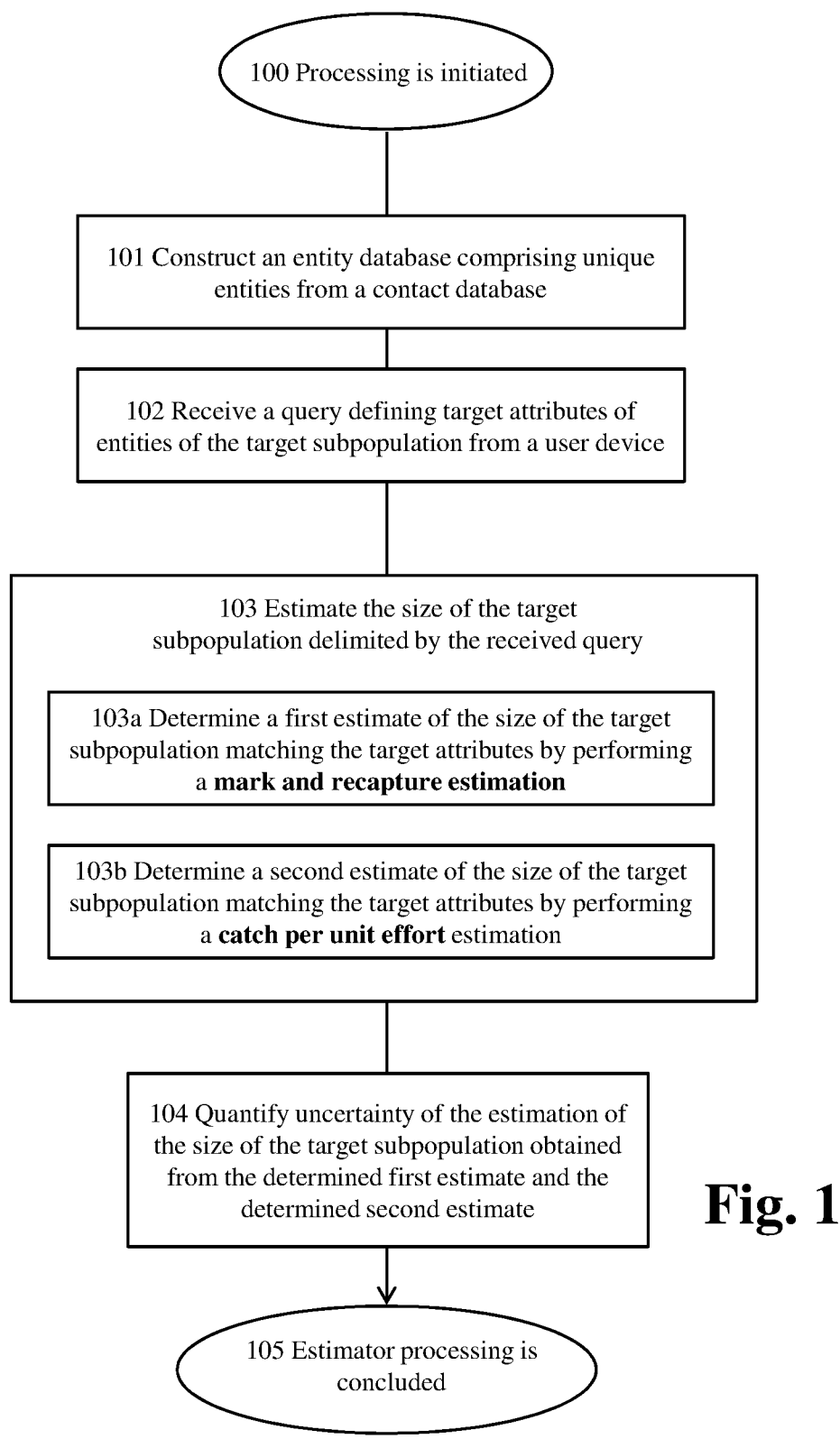
FIG. 1 is a flowchart that illustrates a computer implemented method for estimating a size of a target subpopulation and quantifying size estimation uncertainty, in accordance with one embodiment of the invention.

FIG. 1 is a flowchart that illustrates a computer implemented method for estimating a size of a target subpopulation and quantifying size estimation uncertainty, in accordance with one embodiment of the invention. As used herein, the term "subpopulation" refers to a part or a subdivision of a population with common and distinguishing characteristics. The characteristics comprise, for example, gender, profession, human, animal, etc. The computer implemented method disclosed herein employs a subpopulation size estimation and uncertainty quantification system (SSEUQS) (the "SE system" as characterized herein) comprising at least one processor configured to execute computer program instructions for estimating a size of a target subpopulation and quantifying size estimation uncertainty. The SE system disclosed herein estimates the sizes of arbitrary subpopulations and quantifies estimation uncertainty from a contact database.

The subpopulation size estimation and uncertainty quantification system (SE system) receives contact information associated with multiple contacts from a contact database. The contact database contains contact information of the contacts, for example, cell phone address book information. In an embodiment, the contact information is contributed by multiple users. The SE system constructs 101 an entity database comprising unique entities from the contact database. The entity database defines a mapping between each of the unique entities and one or more of multiple contacts retrieved from the contact database. The SE system maps each contact to a unique individual in the world whose contact information is stored in the contact database. Consider an example where the contact database contains names of contacts such as Joe Smith, Joseph Smith, Janet Doe, and Jane Doe. In this example, the SE system maps the contacts Joe Smith and Joseph Smith to a unique entity "e1" (as characterized herein) and the contacts Janet Doe and Jane Doe to a unique entity "e2" in the entity database, for example, by matching phone numbers and electronic mail (email) addresses coupled with a name similarity. In an embodiment, the subpopulation size estimation and uncertainty quantification system (SE system) augments each of the unique entities in the entity database with additional information from supplementary data sources. In this embodiment, the SE system stores the augmented contact information in the entity database, such as the database 230 described below. The additional information comprises, for example, personal information such as household income, age, gender, etc., and company information such as number of employees, industry, revenue, etc.

A user of the subpopulation size estimation and uncertainty quantification system (SE system) provides a query that specifies desired attributes of entities with the intent of finding matching entities in the entity database and an estimate of the size of the target subpopulation delimited by the query. The SE system receives 102 the query that defines target attributes of entities of the target subpopulation from a user device. The user device is, for example, a personal computer, a tablet computing device, a mobile computer, a mobile phone, a smart phone, a laptop, etc. In an embodiment, the query is an arbitrary query. The SE system dynamically defines subpopulations as queries that specify desired sets of demographic attributes. The matched contacts estimate the subpopulation size and the estimate is delimited by the query. Given the contact database and the query, the SE system estimates the size of the target subpopulation. This estimate is, for example, an estimate of the number of people in the world that fit the demographics based on the people known from the contact database. The SE system estimates multiple subpopulation sizes based on the received query. That is, the SE system estimates 103 the size of the target subpopulation delimited by the received query. In an embodiment, the SE system estimates a subpopulation size by using, for example, a mark and recapture estimation method and a catch per unit effort (CPUE) estimation method, that are used to estimate, for example, animal populations in wild forests.

The subpopulation size estimation and uncertainty quantification system (SE system) estimates 103 the size of the target subpopulation as follows: The SE system determines 103a a first estimate of the size of the target subpopulation matching the target attributes by performing a mark and recapture estimation using a predetermined number of disjoint random samples of contacts, for example, two disjoint random samples of contacts from the contact database and their corresponding unique entities from the entity database.

In the computer implemented method disclosed herein, mark and recapture estimation involves taking a random sample of contacts, finding the corresponding entities, and noting which entities were found. This is followed by taking a second random sample of contacts, finding the corresponding entities, and then finding the overlap with the entities found in the first sample. The SE system determines an estimate of the size of the target subpopulation from the size of the samples and the size of the overlap in the entities. The SE system also determines 103b a second estimate of the size of the target subpopulation matching the target attributes by performing a catch per unit effort estimation using a predetermined number of disjoint random samples of contacts from the contact database and their corresponding unique entities from the entity database. In the computer implemented method disclosed herein, catch per unit effort estimation involves repeatedly taking a fixed size random sample of contacts, finding the corresponding entities that were not found in any previous iteration, and recording the number of such entities. If this process continues for a long period of time, the SE system finds all entities and the number of new entities on that round will be zero. The catch per unit effort estimation method estimates the number of rounds and thus the size of the target subpopulation required to catch all of the entities using linear regression on a plot of the total number of entities caught versus the current catch.

The subpopulation size estimation and uncertainty quantification system (SE system) then quantifies 104 the uncertainty of the estimation of the size of the target subpopulation obtained from the determined first estimate and the determined second estimate. The linear regression used in the catch per unit effort estimation method determines a measure of uncertainty that can be used to estimate uncertainty in the estimate of the size of the target subpopulation. The measure of uncertainty obtained from the catch per unit effort estimation method is combined with the uncertainty obtained from the mark and recapture estimation method to both obtain a more precise estimate of uncertainty and to reduce uncertainty.

In an embodiment, the subpopulation size estimation and uncertainty quantification system (SE system) performs the quantification of the uncertainty of the estimation of the size of the target subpopulation by determining a first variance of the determined first estimate and determining a second variance of the determined second estimate from a slope line. As used herein, the term "variance" refers to a measure of accuracy in estimating a target subpopulation size. For example, if the variance in the target subpopulation size estimation is small, then the target subpopulation size estimation is substantially accurate, and if the variance in the target subpopulation size estimation is large, then the target subpopulation size estimation is comparatively less accurate. For example, the SE system computes variances in the target subpopulation sizes estimated by the mark and recapture estimation method and the catch per unit effort estimation method employed by the SE system. In an embodiment, the SE system generates confidence intervals of the determined second estimate using the determined second variance of the determined second estimate. A confidence interval specifies an upper bound and a lower bound for an estimated value such that the true value lies in a range between the upper bound and the lower bound with a high probability. For example, if "K" is the number of entities marked in a first sample, "n" is the number of entities captured in a second sample, and "k" is the number of entities recaptured, then the variance of the estimate in the size of the target subpopulation may be characterized as: $[(K+1)(n+1)(K-k)(n-k)]/[(k+1)(k+1)(k+2)]$ If K=100, n=100, and k=10, the estimated population size of Kn/k=1000. Since the variance is 56,906, the standard deviation is the square root of the variance which is 239. Therefore, with 95% confidence, the true target subpopulation size lies in the range:

$$1000+/-1.96*239.$$

In an embodiment, if the first variance or the second variance is substantially large, the subpopulation size estimation and uncertainty quantification system (SE system) iteratively performs the determination of the first estimate of the size of the target subpopulation and the determination of the second estimate of the size of the target subpopulation and computes a weighted average of the first estimate and the second estimate to reduce the first variance and/or the second variance. The SE system iteratively estimates the target subpopulation sizes for reducing the computed variance of each estimated target subpopulation size, if a computed variance is larger than another computed variance. In another embodiment, the SE system increases the predetermined number of disjoint samples of contacts used for the determination of the second estimate to reduce the second variance.

Consider an example where the subpopulation size estimation and uncertainty quantification system (SE system) performs the mark and recapture estimation using two disjoint random samples of contacts, for example, S1 and S2 from the contact database to identify corresponding sets of unique entities, E1 and E2. The size of the samples of contacts represented by S and the corresponding size of the sets of unique entities E1 and E2 represented by E differ when multiple contacts for the same unique entity are captured in S. In this example, consider:

M to be the size of the unique entity set E1,
C to be the size of the unique entity set E2, and
R to be the size of the intersection of the sets E1 and E2.
The SE system calculates a standard or first estimate of subpopulation size, for example, using the formula:

$$(M+1)(C+1)/(R+1)-1.$$

In this example of the mark and recapture estimation method, the SE system considers all entities to be equally likely to be identified. However, as some entities are more popular than other entities since these entities have more contacts and are thus more likely to be identified, the SE system applies a correction to the above formula. Using this corrected formula, the SE system leverages that the number of contacts has a power law distribution, which is a typical feature of social networks. While some entities are associated with many contacts, most entities are associated with a small number of contacts. While the standard mark and capture estimation method assumes that all entities are equally likely to be caught, entities with very large social networks are much more likely to be caught. To adjust for this, in an embodiment, the SE system performs non-uniform weighted counting. The counts M, C, and R are computed by summing $1/|e|$ for each entity in the respective set, where $|e|$ is the number of contacts that contribute to the entity. The SE system computes the variance of the first estimate as a function of M, C, and R that is adjusted for non-uniform sampling probability. In the formula above for the variance of the estimate, rather than using standard counts, in an embodiment, the SE system uses weighted counts to yield an adjusted variance estimate that accounts for non-uniform sampling.

Consider an example where the subpopulation size estimation and uncertainty quantification system (SE system) performs the capture per unit effort (CPUE) estimation using "n" number of disjoint samples of contacts, for example, S1, S2, ..., Sn of a fixed size and finds the corresponding sets of entities, for example, E1, E2, ..., En. In this example, consider "xi" to be the sum of the entities, E1, ... Ei, and "yi" to be the number of entities in Ei that are not in E1, ... Ei−1. The SE system fits a linear regression line to x/y values and estimates the size of the target subpopulation as the y intercept of the line divided by the slope. As entities are not sampled uniformly from contacts, the SE system applies a different adjustment to the second estimate. In the CPUE estimation method, the sizes of the entity sets are not raw counts but are weighted counts where the weights are 1/|e| as disclosed above. The SE system obtains confidence intervals on the second estimate from the variance of the second estimate of the slope of the line. If the variance of the first estimate or the second estimate is too large, the SE system runs additional rounds of the mark and recapture estimation method or the CPUE estimation method with new samples not necessarily disjoint from the previous rounds and computes a weighted average of the determined estimates to drive down the variance. In this case, the weighting is the inverse of the variance of the estimates. In an embodiment, the SE system increases the value of "n" in the CPUE estimation method to reduce the variance.

Consider an example for illustrating combining variance, where there is a population of size 1000. In this example, the subpopulation size estimation and uncertainty quantification system (SE system) implements the mark and recapture estimation method using:

M=100,
C=100, and
R=12.

The estimated population size is (M+1)(C+1)/(R+1)−1=833. The variance of that first estimate is [(M+1)(C+1)(M−R)(C−R)]/[(R+1)(R+1)(R+2)]=33,388. The SE system then applies the catch per unit effort estimation method. Three fixed size samples of contacts yield 100, 90, and 84 new entities respectively. These new entities are turned into a sequence of points that indicate the total catch thus far and the incremental catch as follows: (0, 100), (100, 90), (190, 84). The independent variable, the x-axis, is the total catch thus far. The dependent variable, the y-axis, is the incremental catch. The SE system determines the x value for which the line crosses the y-axis, that is, the total catch at which point the incremental catch will be 0 to find all of the entities. In this example, linear regression shows that the x intercept is 1177, that is, the population contains 1177 entities. If the variance in this second estimate is 31,956, the SE system updates the estimate of the true target subpopulation by variance weighting, for example, as follows: Pop(cpue)*Var(mc)/(Var(cpue)+Var(mc))+Pop(mc)*Var(cpue)/(Var(cpue)+Var(mc))=833*33,388/(33,388+31,956)+1177*31,956/(33,388+31,956)=1001. The SE system computes the new variance of the estimate, for example, as follows: 1/Var(new)=1/Var(mc)+1/Var(cpue)=1/33,388+1/31,956, therefore Var(new)=16,328. The SE system therefore provides a much more accurate estimation of the target subpopulation size and a substantially reduced variance.

Figure 2:
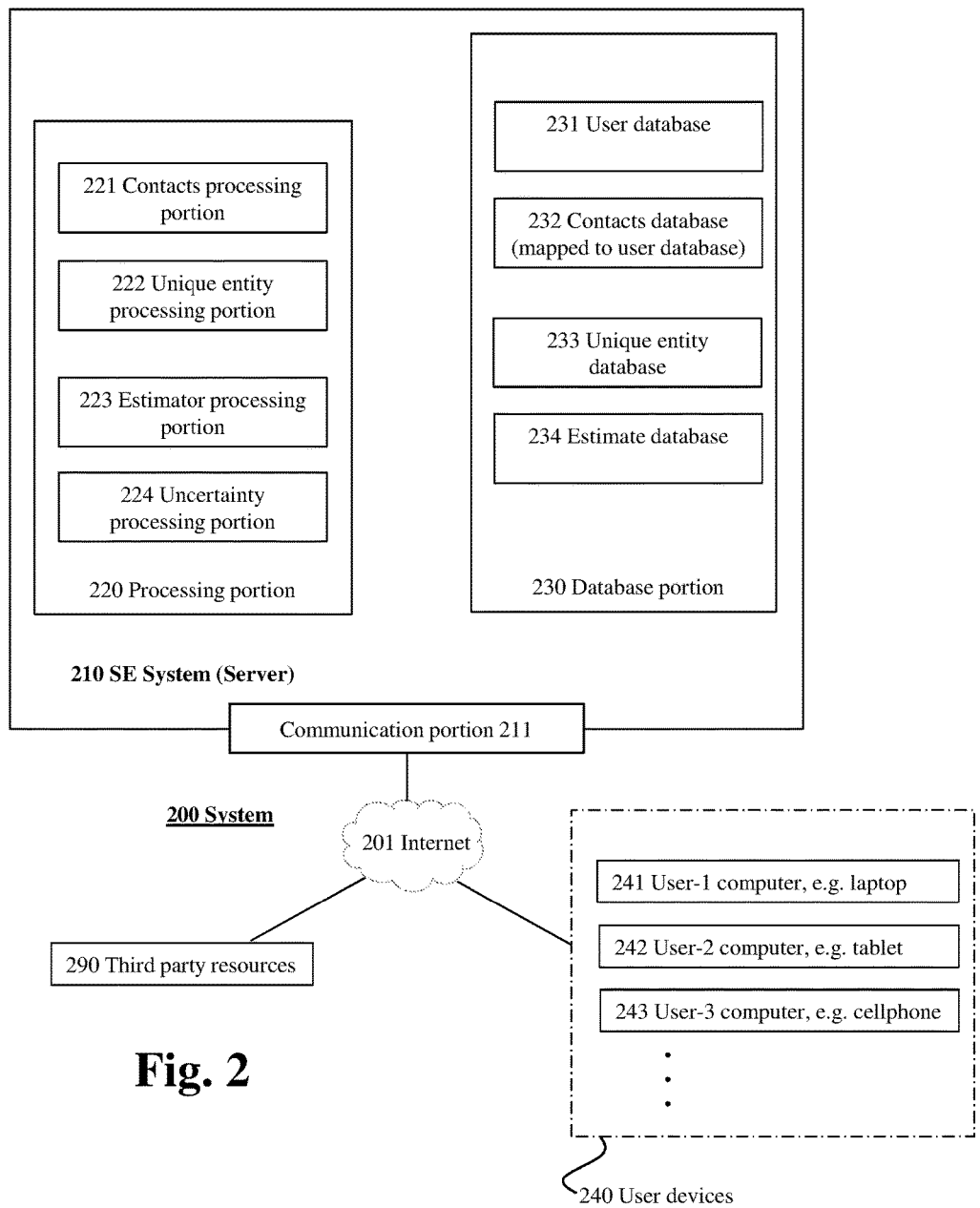
FIG. 2 is a block diagram showing a system 200 that includes an SE system in accordance with one embodiment of the invention.

FIG. 2 is a block diagram showing a system 200 that includes an SE system 210 in accordance with one embodiment of the invention. As shown, the SE system 210 may be in the form of one or more servers. The SE system 210 includes both a processing portion 220, as well as a database portion 230.

As described below, the processing portion 220 performs a wide variety of processing associated with the processing of the invention. As illustrated in FIG. 2, the processing portion 220 includes specialized processing portions. Specifically, such specialized processing portions include a contacts processing portion 221 the performs various processing related to the manipulation of contacts, a unique entity processing portion 222 that performs various processing related to the manipulation of unique entities as described herein, an estimator processing portion 223 that performs estimation related processing, and an uncertainty processing portion 224 the performs uncertainty related processing.

The SE system also includes a communication portion 211. In accordance with embodiments of the invention, the communication portion 211 provides for communication with systems external to the SE system 210, such as between the SE system 210, the third-party resources 290, and end-user devices 240. Further aspects of such processing portions are described below.

The database portion 230 stores a wide variety of data used by the processing portion 220 and/or generated by the processing portion 220. As illustrated in FIG. 2, the database portion 230 includes specialized databases. Specifically, such specialized databases include a user database 231 that includes various user related data, and a contacts database 232 that includes various contacts related information, which may be mapped or otherwise associated with the user database. Additionally, the specialized databases include a unique entity database 233. As described herein, the unique entity database 233 may store a variety of data associated with the generation and manipulation of unique entities. Further, the specialized databases, in the database portion 230, includes an estimate database 234. In accordance with embodiments of the invention, the estimate database 234 may store a variety of information associated with the estimation processing described herein.

Further details and technical aspects of such processing and associated data are described in detail below.

The system 200 also includes a plurality of user devices 240 as well as third-party resources 290. The SE system 210 (with the communication portion 211), third-party resources 290, and user devices 240 may be in electronic communication with each other via the Internet or some other suitable network.

As noted above, the system 200 includes a plurality of user devices 240. Such "plurality" may include thousands and likely millions of user devices. Such user devices (241, 242, 243) as represented in FIG. 2 may be in a wide variety of forms. For example, the user devices might be in the form of a computer, laptop, a tablet, a cell phone, or any other user device (as further described below) capable of interfacing with the SE system 210.

The third-party resources 290 represent that the SE system 210 may be provided access to a wide variety of external data resources. For example, the third-party resources 290 might be in the form of signature data resources, which are utilized by the SE system 210.

Figure 3:
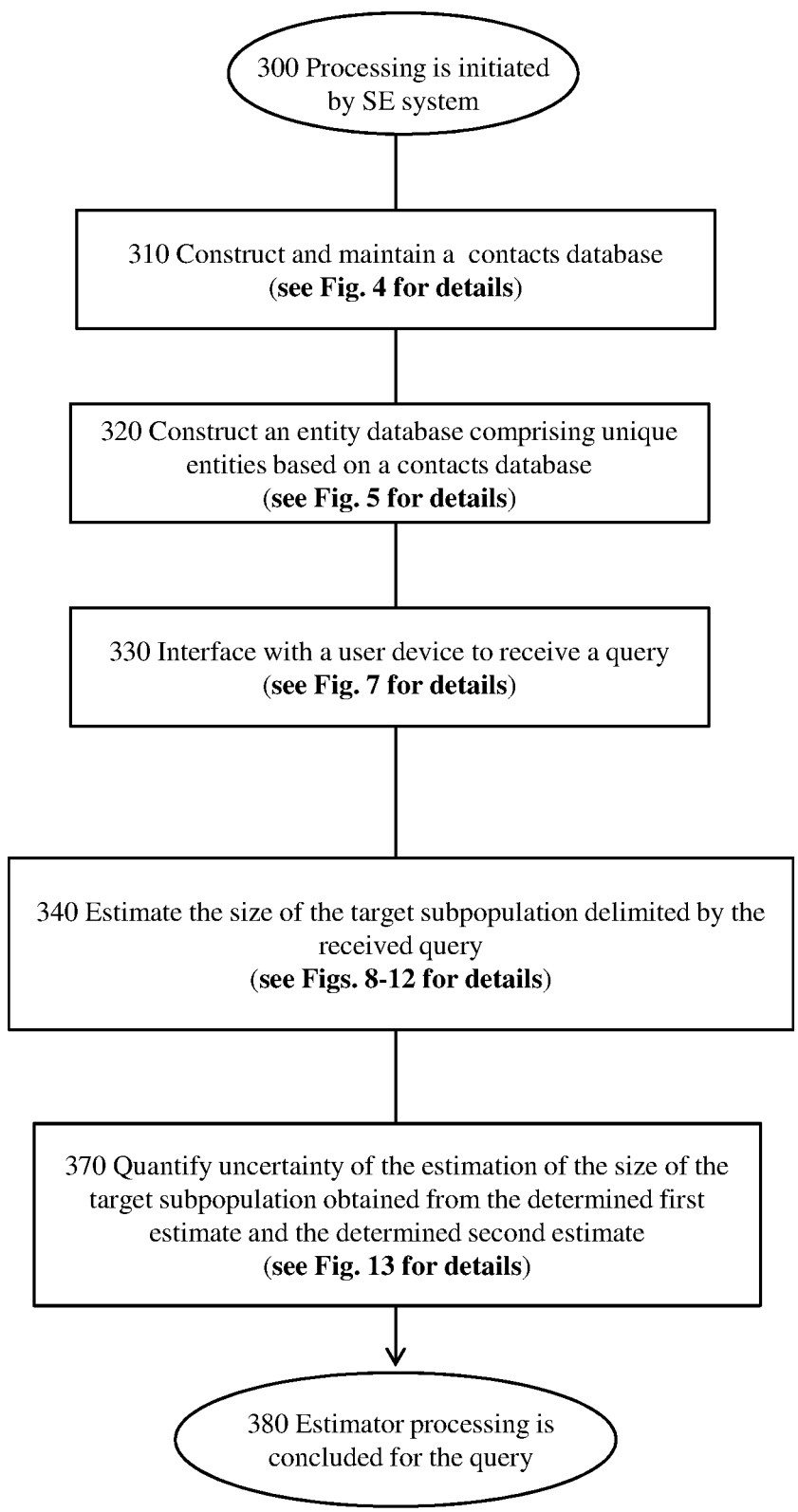
FIG. 3 is a high-level flowchart showing processing performed by the SE system in accordance with one embodiment of the invention.

FIG. 3 is a high-level flowchart showing processing performed by the SE system 210 in accordance with one embodiment of the invention. Various aspects of the SE system 210 are described below with reference to the flowchart of FIG. 3 and accompanying flow charts and diagrams.

As shown, the processing of FIG. 3 (performed by the SE system 210) starts in step 300 and passes to step 310. Step 310 shows that to the SE system 210 constructs and maintains a contacts database. Illustratively, the database portion 230 (in the SE system 210) includes a contacts database 232. However, it is appreciated that such a contacts database may not be disposed within the SE system 210, but rather disposed externally of the SE system 210. For example, the SE system 210 may be provided access and utilize a contacts database disposed in one of the third-party resources 290.

Further details of the processing of step 310 and the contacts database are described below with reference to FIG. 4, in particular. After the processing of step 310, as shown in FIG. 3, the process passes to step 320.

In step 320, the SE system 210 constructs an entity database comprising unique entities. More specifically, the SE system 210 constructs such an entity database (i.e. the unique entity database 233) based on data in a contacts database 232. Further details of the processing of step 320 are described below with reference to FIG. 5. After the processing of step 320, the process passes to step 330.

In step 330, the SE system 210 interfaces with the user device to receive a query from that user device. For example, the query (input from a user device) identifies attributes of a target subpopulation, in accordance with one embodiment of the invention. For example, the user device might be a laptop 241 as illustrated in FIG. 2. After step 330, and upon a query being received by the SE system 210, processing passes to step 340.

In step 340, the SE system 210 estimates the size of the target subpopulation delimited by the received query. Various details of such processing are described below with reference to FIG. 8 and related FIGS. 9-12. In accordance with embodiments of the invention, once the system estimates the size of the target subpopulation in step 340, the process then passes to step 370.

In step 370, the SE system 210 quantifies the uncertainty associated with the estimations of the size of the target subpopulation. More specifically, in an embodiment, the system generates a determined first estimate and generates a determined second estimate—and the processing of step 370 quantifies such estimates. The process of step 370 is described in further detail below, with reference to FIG. 13.

After step 370, as shown in FIG. 3, the process performed by the SE system 210 passes to step 380. In step 380, the estimator processing is concluded.

Figure 4:
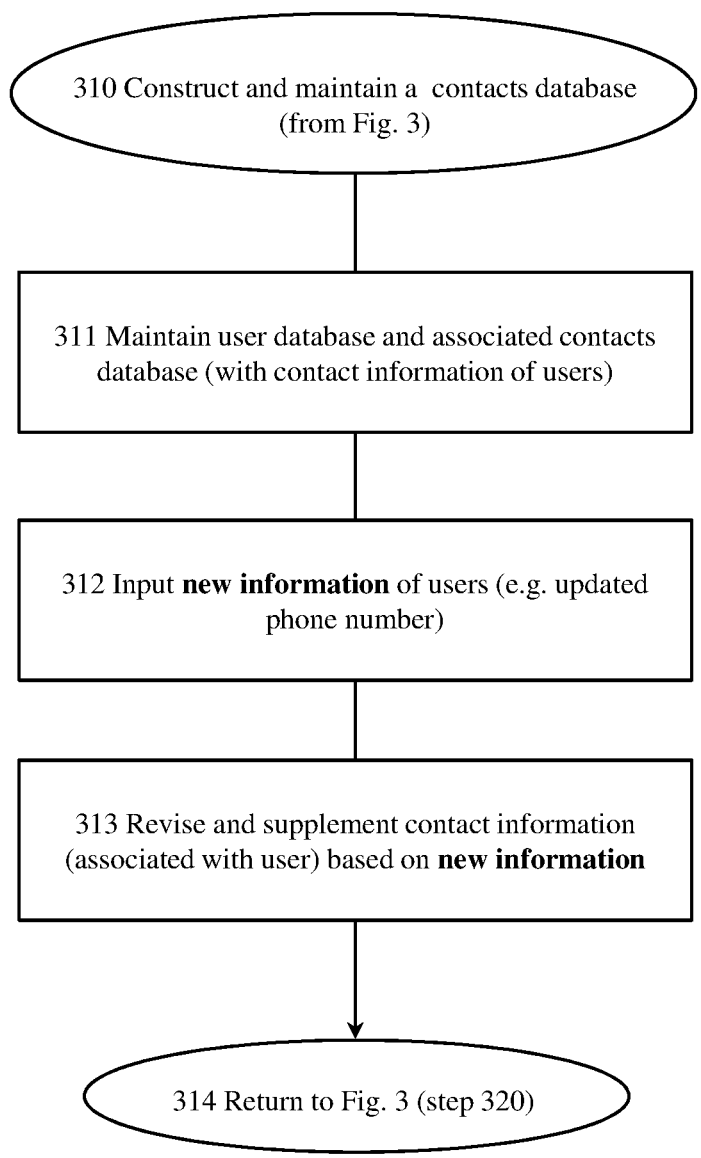
FIG. 4 is a flowchart showing in further detail the "construct and maintain a contacts database" step of FIG. 3, in accordance with one embodiment of the invention.

FIG. 4 is a flowchart showing in further detail the "construct and maintain a contacts database" step 310 of FIG. 3, in accordance with one embodiment of the invention. As shown, the process starts in step 310 and passes to step 311. Step 311 reflects that the system maintains a user database and associated contacts database. The data in the user database may be mapped or otherwise associated with the data in the contacts database, such as through utilization of a relational database or other architecture, for example. Step 312 reflects that in the normal course the system will input new information of users, such as a phone number. Hand in hand, as reflected in step 313, the system revises and supplements contact information based on new information, in an ongoing manner. After step 313, the processing passes to step 314. The processing then passes to step 320 of FIG. 3. It is appreciated that the processing of FIG. 4 will be performed on an ongoing basis and may include a variety of related processes such as adding new users, the deleting current users, and a wide variety of related processes. The contacts database described herein and other features of the invention, described herein, may be integrated with and used with known technology, such as the technology described in U.S. Pat. No. 8,825,784 issued Sep. 2, 2014 to Ramnani (Automatic profile update in a mobile device) and U.S. Pat. No. 8,499,037 issued Jul. 30, 2013 to Ramnani (Automatic profile update in a mobile device), both of which are incorporated herein by reference in their entirety.

Figure 5:
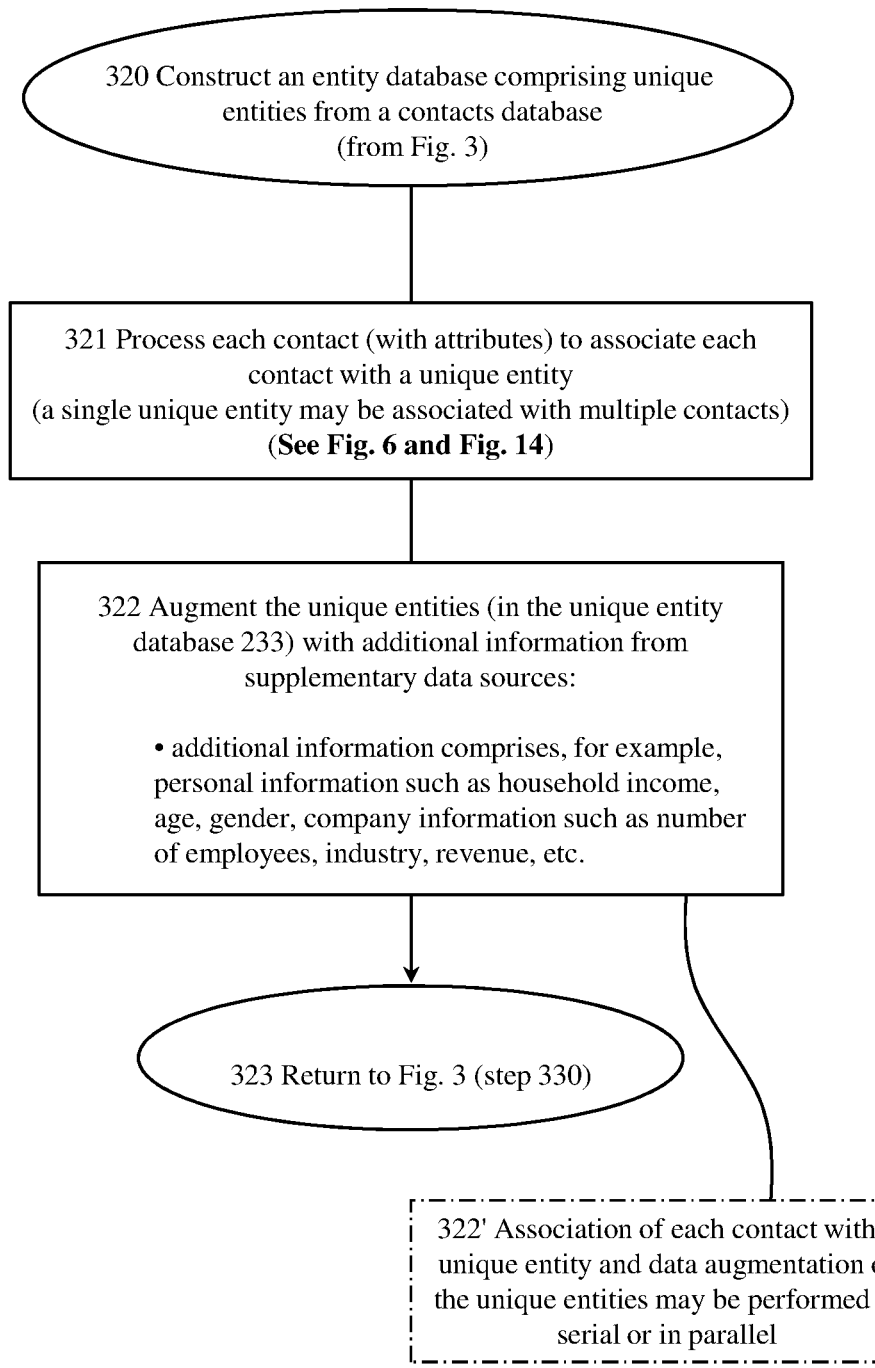
FIG. 5 is a flowchart showing in further detail the "construct an entity database comprising unique entities from a contacts database" step of FIG. 3, in accordance with one embodiment of the invention.

FIG. 5 is a flowchart showing in further detail the "construct an entity database comprising unique entities from a contacts database" step 320 of FIG. 3, in accordance with one embodiment of the invention.

As shown, the process starts in step 320 and passes to step 321. In step 321, the SE system 210 processes each contact, including attributes associated with each contact, to associate each contact with what is herein characterized as a "unique entity". A single unique entity may be associated with multiple contacts. This occurs in a situation, for example, where two contacts have similar attributes, as described above. Details of the processing of step 321 are described below with reference to the flowchart of FIG. 6 and the diagram of FIG. 14. After step 321, the process passes to step 322.

Figure 14:
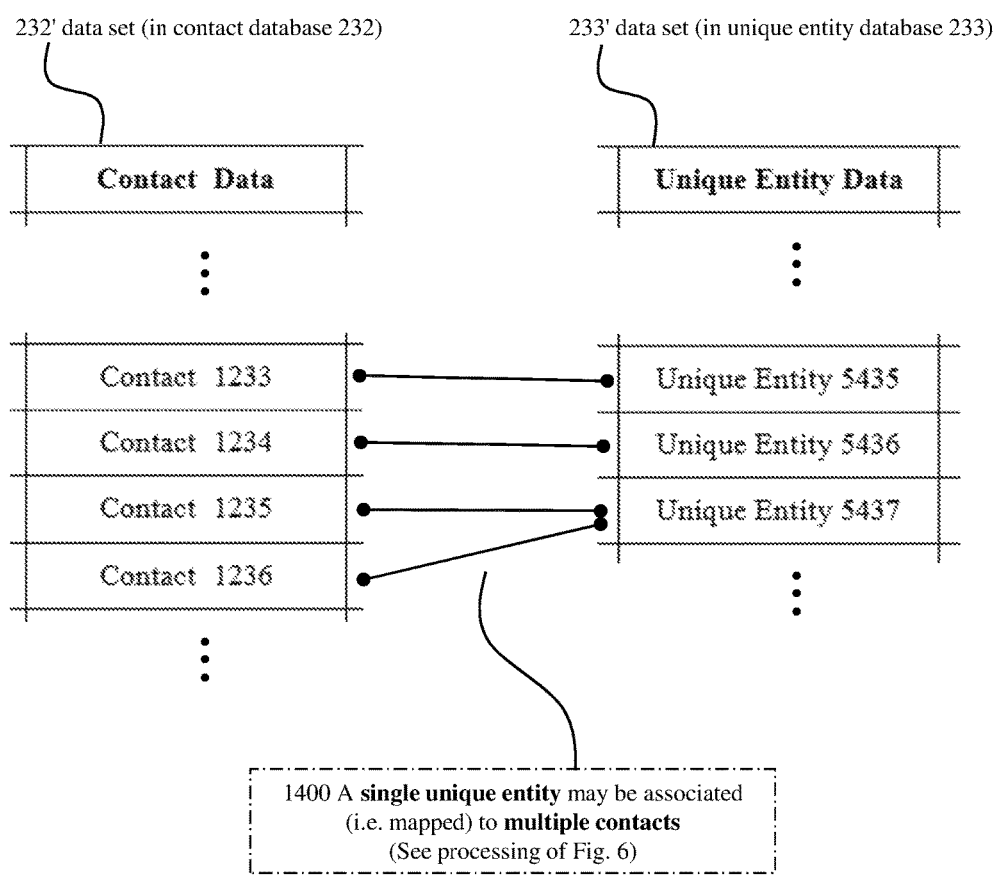
FIG. 14 is a diagram showing a relationship between contact data and unique entity data, in accordance with one embodiment of the invention.

FIG. 14 is a diagram showing a relationship between contact data and unique entity data, in accordance with one embodiment of the invention. FIG. 14 shows a data set 232' that contains various contact data. Illustratively, the data set 232' may be stored in the contact database 232. Additionally, FIG. 14 shows a data set 233' that contains various unique entity data. As reflected in box 1400 of FIG. 14, a single unique entity may be associated to multiple contacts. This association and related processing are described herein and in particular with reference to FIG. 6.

As shown in FIG. 5, in step 322 the system performs processing to augment the information, i.e. data, associated with each unique entity. More specifically, for each unique entity (in the unique entity database to 33) the system performs processing to augment such unique entities with additional information from supplementary data sources. As a shown, such additional information may include, for example, personal information such as household income, age, gender, and company information such as employees, industry, and revenue, for example. It is of course appreciated that various other information may be included—as such other information is available and can be associated with a particular unique entity.

Illustratively, the association of additional information with a particular unique entity might be performed by matching or associating attributes of a particular unique entity with attributes of an individual's data set in the third-party resources 290, for example. Once this matching is attained, additional information in the individual's data set (not common to the particular unique entity) may then be input (by the SE system 210) to supplement, i.e. augment, the particular the unique entity. Accordingly, such additional information may be secured from the third-party resources 290 as shown in FIG. 2.

As reflected in box 322' of FIG. 5, association of each contact with a unique entity and data augmentation of the unique entities need not be performed in a particular order. The association of each contact with the unique entity and augmentation of data may be performed in serial, in parallel, or in some other order or methodology, as may be desired. However, in accord with one embodiment of the invention, it may be needed to first establish a unique entity, with associated attributes, so as to have the needed information to perform augmentation of such unique entity.

After the augmentation processing of step 322, the process passes to step 323. In step 323, the process returns to FIG. 3 (step 330).

Figure 6:
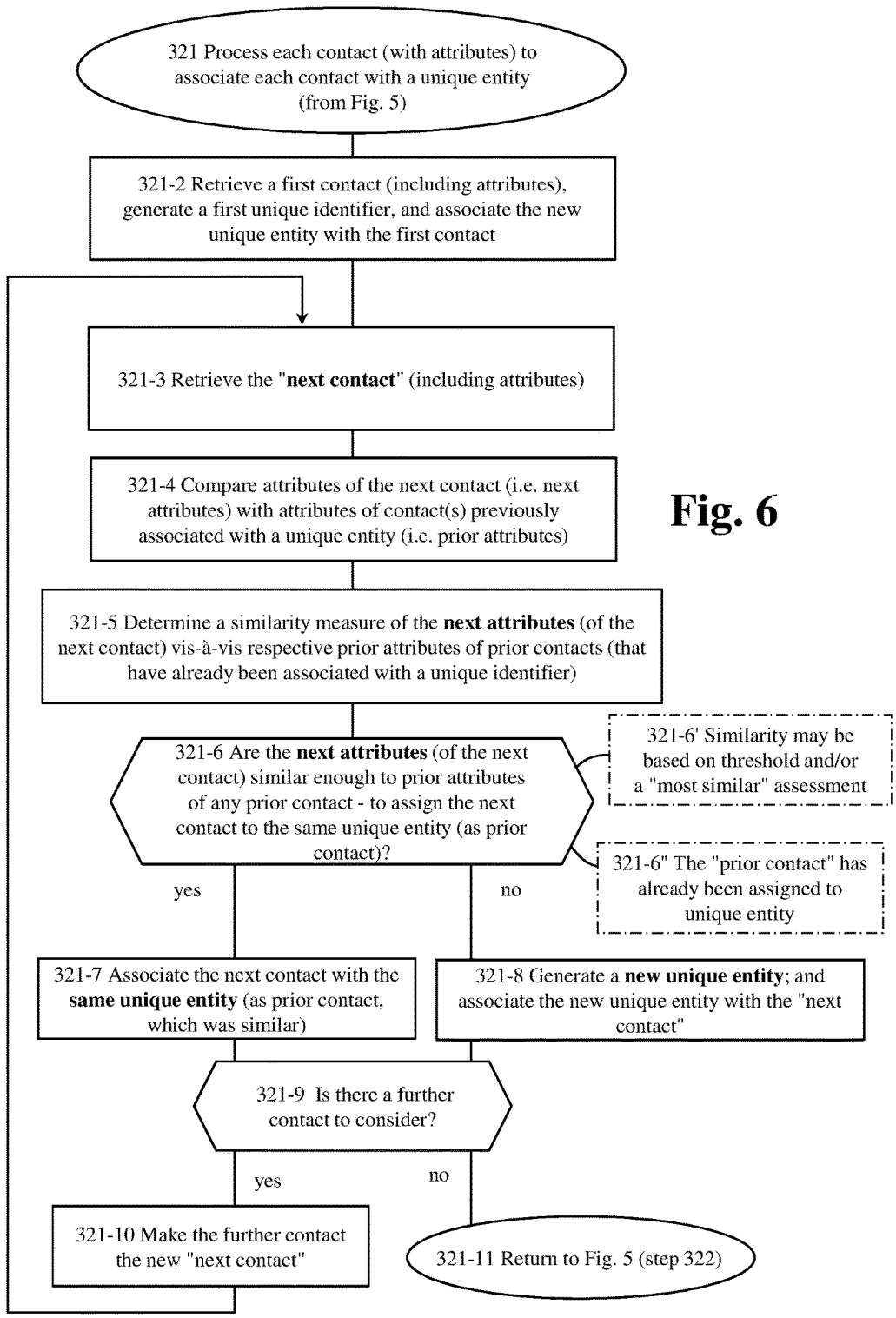
FIG. 6 is a flowchart showing in further detail the "process each contact, with attributes, to associate each contact with a unique entity" step of FIG. 5, in accordance with one embodiment of the invention

FIG. 6 is a flowchart showing in further detail the "process each contact, with attributes, to associate each contact with a unique entity" step 321 of FIG. 5, in accordance with one embodiment of the invention. As shown, the process starts in step 321 and passes to step 321-2.

In step 321-2, the SE system retrieves a first contact (including attributes). The system also generates a first unique identifier. Given each is the first, the SE system associates such new unique entity with the first contact. Thereafter, the processing passes to step 321-3.

In step 321-3, the SE system retrieves the "next contact" including attributes. As characterized in this description of the processing, such attributes are termed "next attributes"—since such attributes are associated with the "next contact".

Then, in step 321-4, the system compares the next attributes (of the next contact) with attributes of one or more contacts that have been previously associated with a unique entity. As characterized in this description of the processing, such is termed "prior attributes" that are respectively associated with "prior contacts". It is appreciated that the number of contacts involved in this processing may be numerous—numbering into the thousands or millions. After the processing of step 321-4, the processing passes to step 321-5.

In step 321-5, based on the comparison of the attributes (in step 321-4) the system determines a similarity measure of the next attributes (of the next contact) vis-à-vis respective prior attributes of prior contacts, which have already been associated with a unique identifier. In accord with one aspect of the invention, an objective in such processing is to associate contacts having similar attributes (and assumedly associated with a single individual) to a single unique entity. After the processing of step 321-5, the process passes to step 321-6.

In step 321-6, the system performs a determination of whether the next attributes (of the next contact) are similar enough to prior attributes of any respective prior contact—so as to assign the next contact to the same unique entity, i.e. to assign the next contact to the same unique entity that possessed the identified similar attributes. Accordingly, if a previously associated contact does indeed have similar enough attributes, then the determination for the "next contact" is "yes" in step 321-6. As a result, the processing passes to step 321-7. In step 321-7, the system associates the next contact with the same unique entity (as the prior contact, which was similar).

On the other hand, it may be the situation in step 321-6 that there is not a prior contact having similar attributes. In this situation, the processing passes from step 321-6 to step 321-8. In step 321-8, the SE system generates a new unique entity, and associates that new unique entity with the "next contact". Accordingly, at that point in time, the "next contact" would be the only contact associated with the newly created unique entity. However, in subsequent processing of additional contacts, one or more of such additional contacts may indeed be associated with the newly created unique entity, i.e. if any of such additional contacts are found to be similar enough.

As reflected in box 321-6' of FIG. 6, the similarity determination of step 321-6 may be determined based on a suitable threshold and/or based on a "most similar" assessment. It is appreciated that various attributes of any particular contact may be taken into account in determination of whether a contact, and associated attributes, are or are not similar enough to be associated with the same unique entity. Additionally, the system may take into account whether two or more attributes are similar. For example, (using the terminology of this example) if a name associated with the next contact matches with a particular prior contact AND a phone number associated with the next contact matches with the same particular prior contact—then such as highly indicative that both contacts are associated with the same individual. Accordingly, the system would beneficially associate such "next contact" and the particular prior contact with the same unique entity.

With further reference to FIG. 6, after the processing of step 321-7 or after the processing of step 321-8, processing performed by the SE system passes to step 321-9.

In step 321-9, the system makes a determination of whether there is a further contact to consider. If "yes" in step 321-9, then the processing passes to step 321-10. In step 321-10, the system tags that further contact as a new "next contact". Processing then passes back to step 321-3 and continues in the manner described above.

On the other hand, it may be determined in step 321-9 that there is not a further contact to consider. In such situation, the processing passes to step 321-11. In step 321-11, the processing returns to FIG. 5 (step 322).

It is appreciated that the processing illustratively described with reference to FIG. 6 may be reflective of a "batch" of contacts, with attributes, for the system to process. However, it may be the situation that processing of FIG. 6 is performed in an ongoing manner as more contacts become available. Also, it may be the situation that the particular group of contacts utilized with any particular query may be varied vis-à-vis the particular group of contacts utilized with another query.

Figure 7:
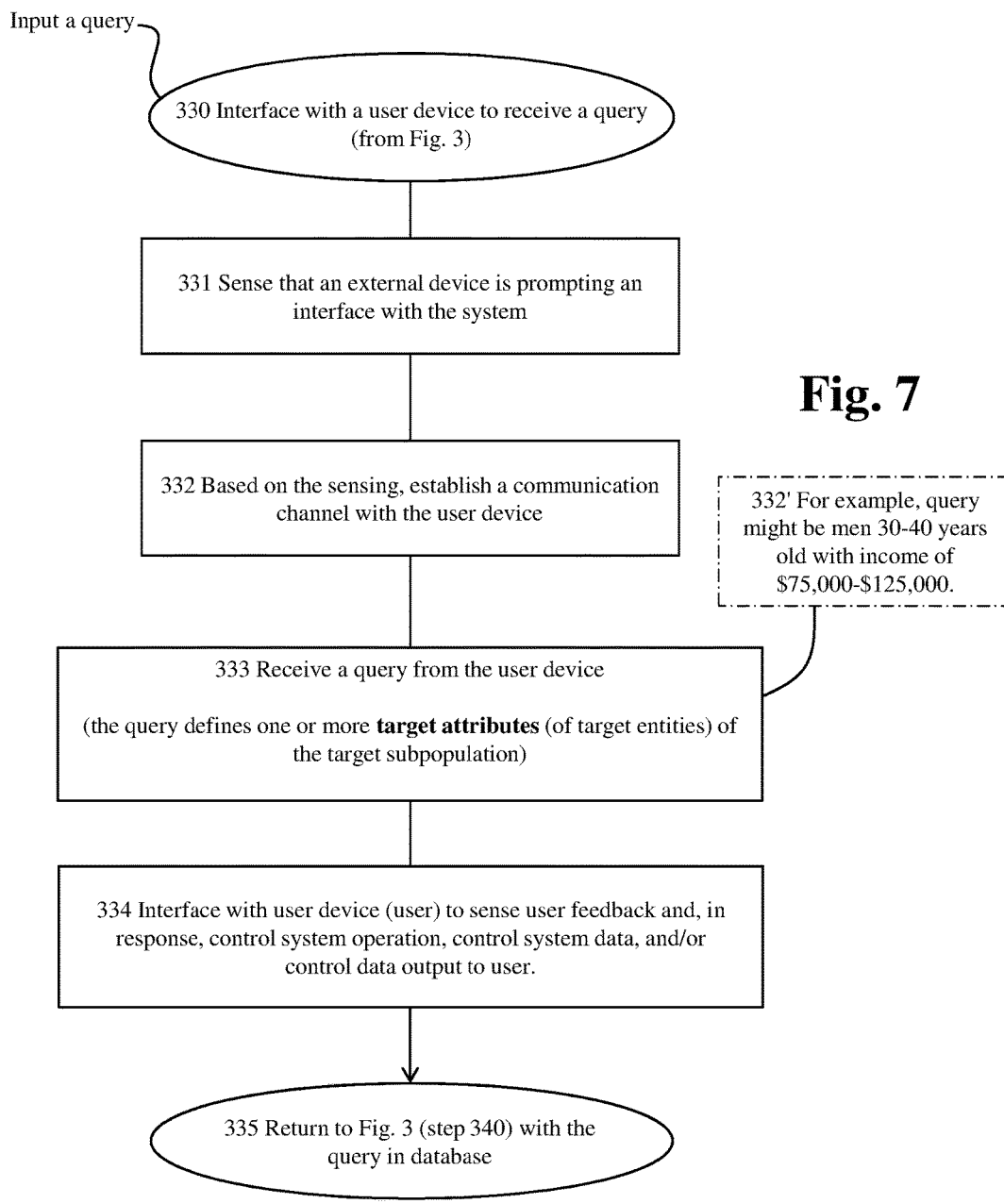
FIG. 7 is a flowchart showing in further detail the "interface with a user device to receive a query" step of FIG. 3, in accordance with one embodiment of the invention.

FIG. 7 is a flowchart showing in further detail the "interface with a user device to receive a query" step 330 of FIG. 3, in accordance with one embodiment of the invention. As shown, the process starts in step 330 and passes to step 331. In step 331, the SE system senses that an external device is prompting an interface with the SE system. Then, in step 332, based on the sensing, the SE system establishes a communication channel with the user device. Illustratively, the communication channel may be in the form of a web interface over the Internet. The user device might be a cell phone or a computer, for example. Then, in step 333, the SE system receives a query from the user device. As reflected in FIG. 7, the query defines one or more target attributes (of target entities)—to be applied against the target population. As illustratively shown in box 332' of FIG. 7, the query might be for men 30 to 40 years of age with the income of $75,000-125,000, for example.

After step 333 and receiving a query from a user device (user), the processing passes to step 334. In step 334, the system interface with a user device (i.e. a user) to sense user feedback and, in response, control system operation, control system data, and/or control data output to user.

The processing of step 334 illustrates various ways in which the SE system 210 may interact with a user device, i.e. a user, so as to control system operations and/or control the way data is stored, manipulated, and presented by the system to the user (via the user device).

In accordance with one embodiment, the system interfaces with a user device over a suitable network such as the Internet. The interface may be affected via various channels, such as a web session over the Internet, for example. Such interface may include the system presenting data to the user. The data may include a selection option. Accordingly, the system provides for data to be presented to a user—and the user to select options associated with that data. Illustratively, it may be the situation that a user submits a query to the system 210, and the system then outputs responsive data (estimation data for example) subsequent to the system performing processing based on the query. The system is provided with functionality to interface with the user to adjust attributes of the query. For example, the responsive data may be deficient in some manner for the user's objectives. Accordingly, the user is provided mechanisms to adjust attributes associated with the query, such as adjusting the search criteria. In particular, this might be the situation where the number of identified matches in the responsive data is too low for the user's objectives. Accordingly, the system includes various mechanisms to interface with a user to adjust search criteria. Also, the system includes various mechanisms to interface with the user to adjust the particular population or populations to which the query is applied.

It is appreciated that—the system 210 may include mechanisms such that aspects of the processing, as described herein, in addition to the search query itself may be altered. For example, the speed of the estimation processing, as described herein, may be altered. For example, the manner in which the estimation processing is progressed may be altered and controlled through user interface and sensing user selections, in the form of data input via a user device. For example, the system 210 may include a mechanism by which the user may pause the estimation processing, as described herein, at distinct points in the processing. For example, based on input sensed from a user device, the system 210 might pause processing after the estimation processing of step 340 and before the uncertainty quantification processing of step 370. In general, any of a wide variety of system attributes and/or system process may be controlled through interface with a user device—and sensing inputs (from the user) from that user device.

After the processing of step 334, the process passes to step 335. In step 335, the processing returns to FIG. 3 (step 340). Accordingly, at this point in the processing the query has been retained in the database portion 230, for example, and in subsequent processing the SE system applies that query to a population as described below.

Figure 8:
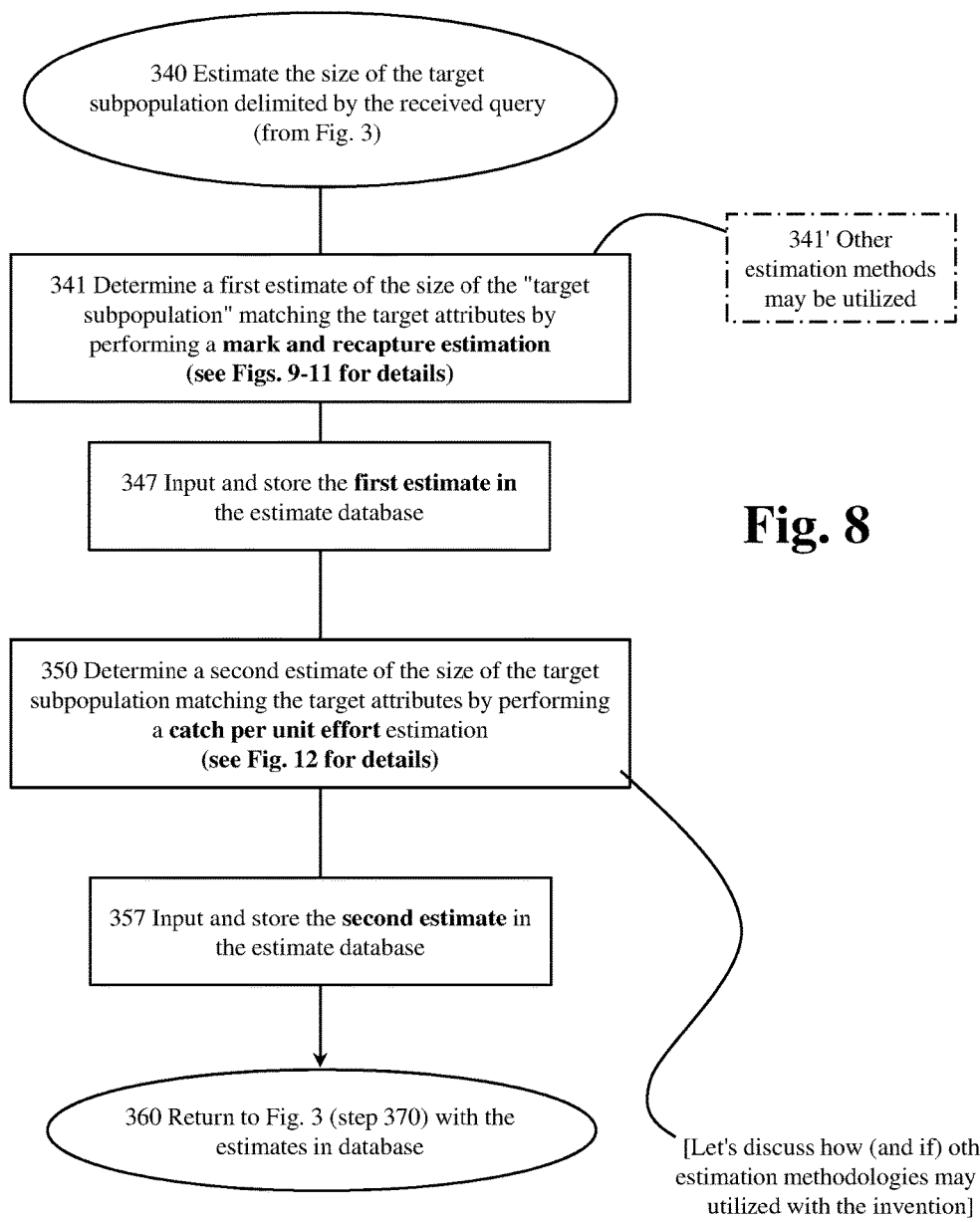
FIG. 8 is a flowchart showing in further detail the "estimate the size of the target subpopulation delimited by the received query" step of FIG. 3, in accordance with one embodiment of the invention.

FIG. 8 is a flowchart showing in further detail the "estimate the size of the target subpopulation delimited by the received query" step 340 of FIG. 3, in accordance with one embodiment of the invention. The process starts in step 340 and then passes to step 341. In step 341, the SE system determines a first estimate of the size of the "target subpopulation" matching the target attributes of the query. In accord with one embodiment of the invention, the system utilizes what is herein characterized as a "mark and recapture estimation" methodology. Further details of such methodology are described below and in particular with reference to FIGS. 9-11. It is appreciated that other estimation methodologies may be utilized in accordance with embodiments of the invention. Then, as reflected in step 347, the SE system inputs and stores the first estimate in the estimate database 234. After the first estimate is input and stored in step 347, the processing passes to step 350.

In step 350 of FIG. 8, the SE system of the size of the target subpopulation matching the target attributes as delimited in the query. In accord with one embodiment of the invention, the system utilizes what is herein characterized as a "catch per unit effort" estimation. Further details of such processing are described below with reference to FIG. 12.

After the processing of step 350, the process passes to step 357. In step 357, the SE system then inputs and stores the second estimate in the estimate database 234. Then, the processing passes to step 360. In step 360, the process passes to step 370 of FIG. 3 with the generated estimates in the database portion 230.

Figure 9:
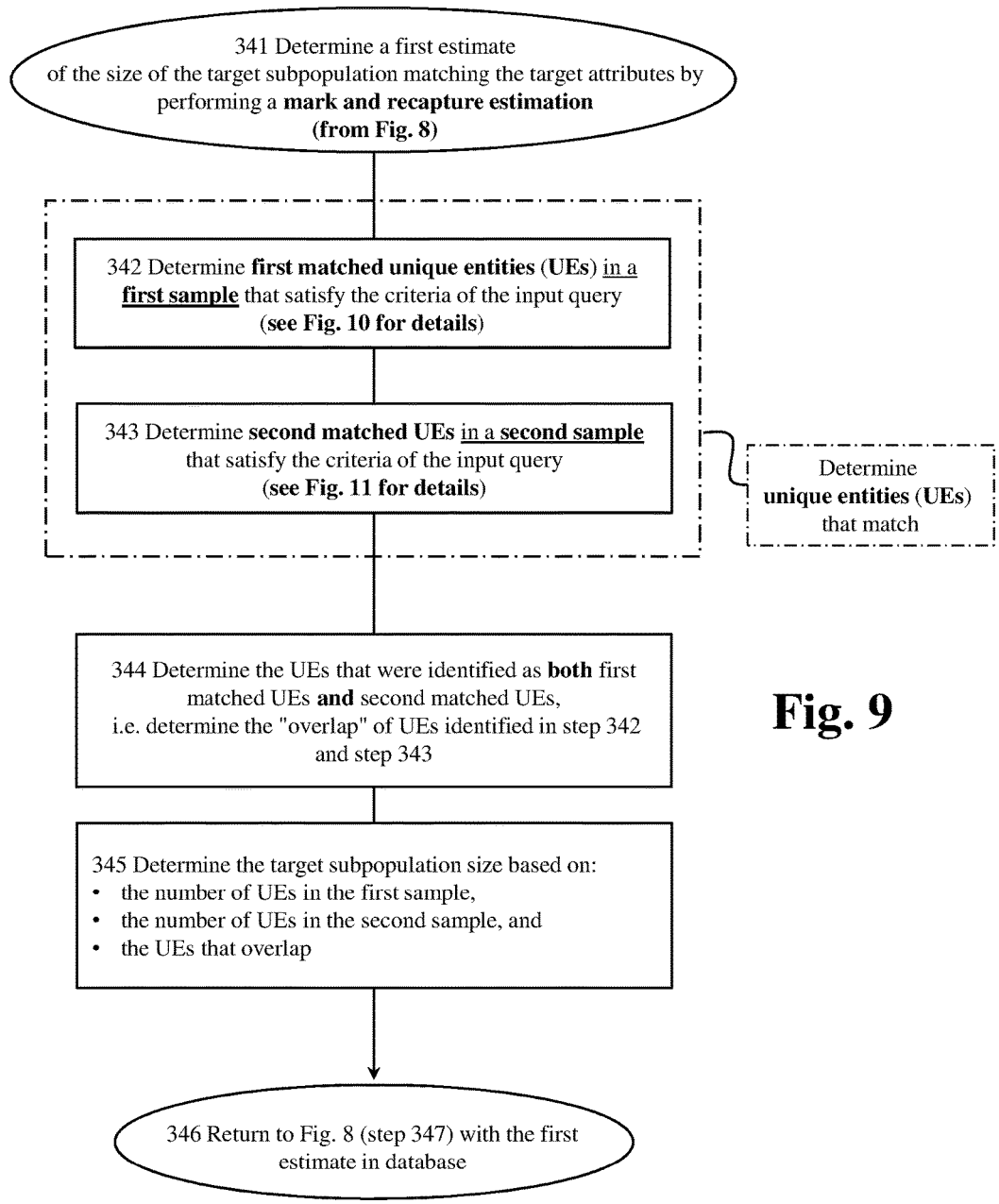
FIG. 9 is a flowchart showing in further detail the "determine a first estimate of the size of the target subpopulation matching the target attributes by performing a market and recapture estimation" step of FIG. 8, in accordance with one embodiment of the invention.
Figure 10:
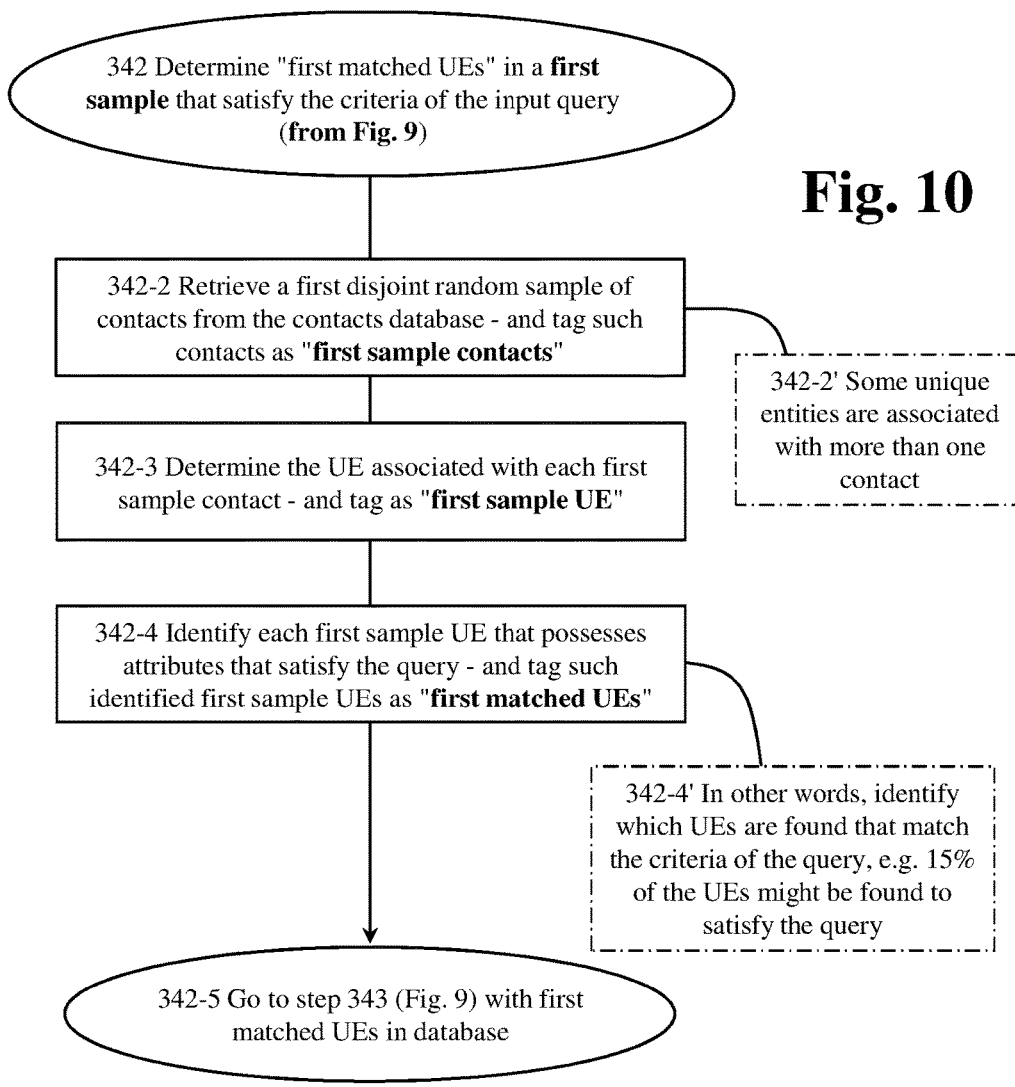
FIG. 10 is a flowchart showing in further detail the "determine first matched unique entities (in a first sample) that satisfy the criteria of the input query" step of FIG. 9, in accordance with one embodiment of the invention.
Figure 11:
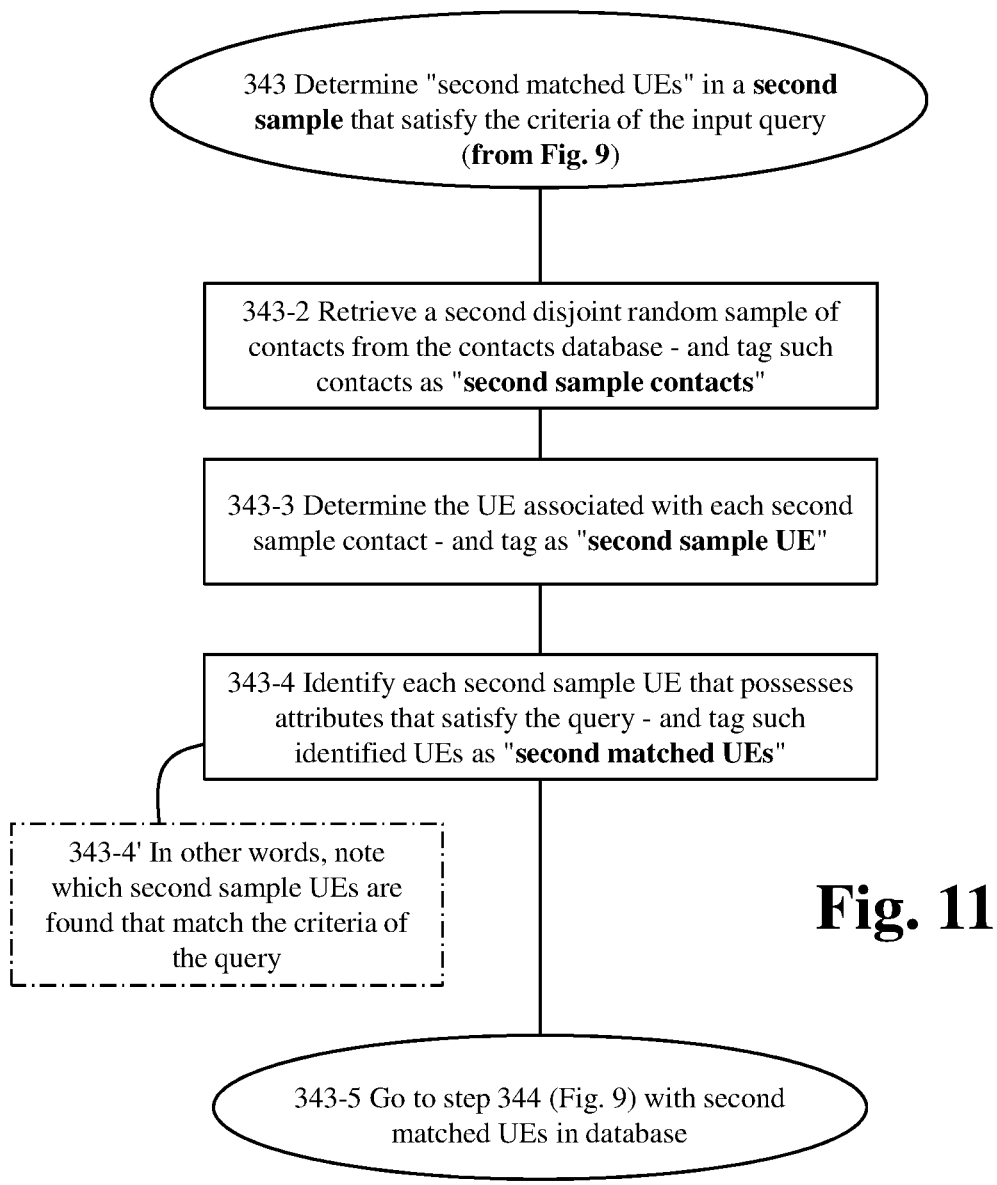
FIG. 11 is a flowchart showing in further detail the "determine second matched unique entities (in a second sample) that satisfy the criteria of the input query" step of FIG. 9, in accordance with one embodiment of the invention.

FIGS. 9-11 relate to "mark and recapture estimation" processing in accordance with an embodiment of the invention. In particular, FIG. 9 shows in further detail the "determine a first estimate of the size of the target subpopulation matching the target attributes by performing a market and recapture estimation" step 341 of FIG. 8, in accordance with one embodiment of the invention. As shown, the process starts in step 341 and passes to step 342.

In step 342, the SE system determines first matched unique entities (in a first sample) that satisfy the criteria of the input query. Further details are described below with reference to FIG. 10. After step 342, the process passes to step 343. In step 343, the SE system determines second matched unique entities (in a second sample) the satisfy the criteria of the input query. Further details are described below with reference to FIG. 11. After step 343, the process passes to step 344.

In the processing of step 344, the system determines the unique entities that were identified as both first matched unique entities and second matched unique entities. In other words, the system determines the "overlap" of UEs identified in step 342 and step 343. Then, the process passes to step 345.

In step 345, the processing determines the target subpopulation size based on the processing performed in steps 342, 343, and 344. More specifically, the SE system determines the target subpopulation size based on the number of UEs in the first sample, the number of UEs in the second sample, and the UEs that overlap both the first sample and the second sample.

After step 345 of FIG. 9, processing passes to step 346. In step 346, the process passes to step 347 of FIG. 8, with the first estimate in the database.

FIG. 10 is a flowchart showing in further detail the "determine first matched unique entities (in a first sample) that satisfy the criteria of the input query" step 342 of FIG. 9, in accordance with one embodiment of the invention. As shown, the process starts in step 342 and passes to step 342-2. In step 342-2, the system retrieves a first disjoint random sample of contacts from the contacts database. The system then tags such contacts as "first sample contacts". As reflected in box 342-2' and as described above, some unique entities are associated with more than one contact. After the processing of step 342-2, the process passes to step 342-3.

In step 342-3, the system determines the particular unique entity associated with each first sample contact. The system then tags these unique entities as "first sample unique entities". Then, the process passes to step 342-4.

As shown in FIG. 10, in step 342-4, the system identifies each "first sample unique entity" that possesses attribute(s) that satisfy the query. These identified unique entities are then tagged as "first matched unique entities". As reflected in box 342-4', in other words, the SE system identifies the unique entities found that match the criteria of the query. Illustratively, it might be the situation that 15% of the unique entities are found that satisfy the query.

After the processing of step 342-4, as shown in FIG. 10, the process passes to step 342-5. In step 342-5, the process returns to FIG. 9—and more specifically passes to step 343 of FIG. 9. At this point in the processing, "first matched unique entities" have been identified by the SE system and stored in the database portion 230.

FIG. 11 is a flowchart showing in further detail the "determine second matched unique entities (in a second sample) that satisfy the criteria of the input query" step 343 of FIG. 9, in accordance with one embodiment of the invention. As shown, the process starts in step 343 and passes to step 343-2. In step 343-2, the system retrieves a second disjoint random sample of contacts from the contacts database. The system then tags such contacts as "second sample contacts". After the processing of step 343-2, the process passes to step 343-3.

In step 343-3, the system determines the particular unique entity associated with each second sample contact. The system then tags these unique entities as "second sample unique entities". Then, the process passes to step 343-4.

As shown in FIG. 11, in step 343-4, the system identifies each "second sample unique entity" that possesses attribute(s) that satisfy the query. These identified unique entities are then tagged as "second matched unique entities". As reflected in box 343-4', in other words, the SE system again identifies the unique entities found that match the criteria of the query. After the processing of step 343-4, as shown in FIG. 10, the process passes to step 343-5. In step 343-5, the process returns to FIG. 9—and more specifically passes to step 344 of FIG. 9. At this point in the processing, "second matched unique entities" have been identified by the SE system and stored in the database portion 230.

As described above with reference to FIG. 9, upon the processing step 342 of FIG. 9 and step 343 FIG. 9—the processing of step 344 is performed. That is, in step 344 the system determines the unique entities that were identified as both first matched unique entities and second matched unique entities. In other words, the system determines the "overlap" as is also described above.

Figure 12:
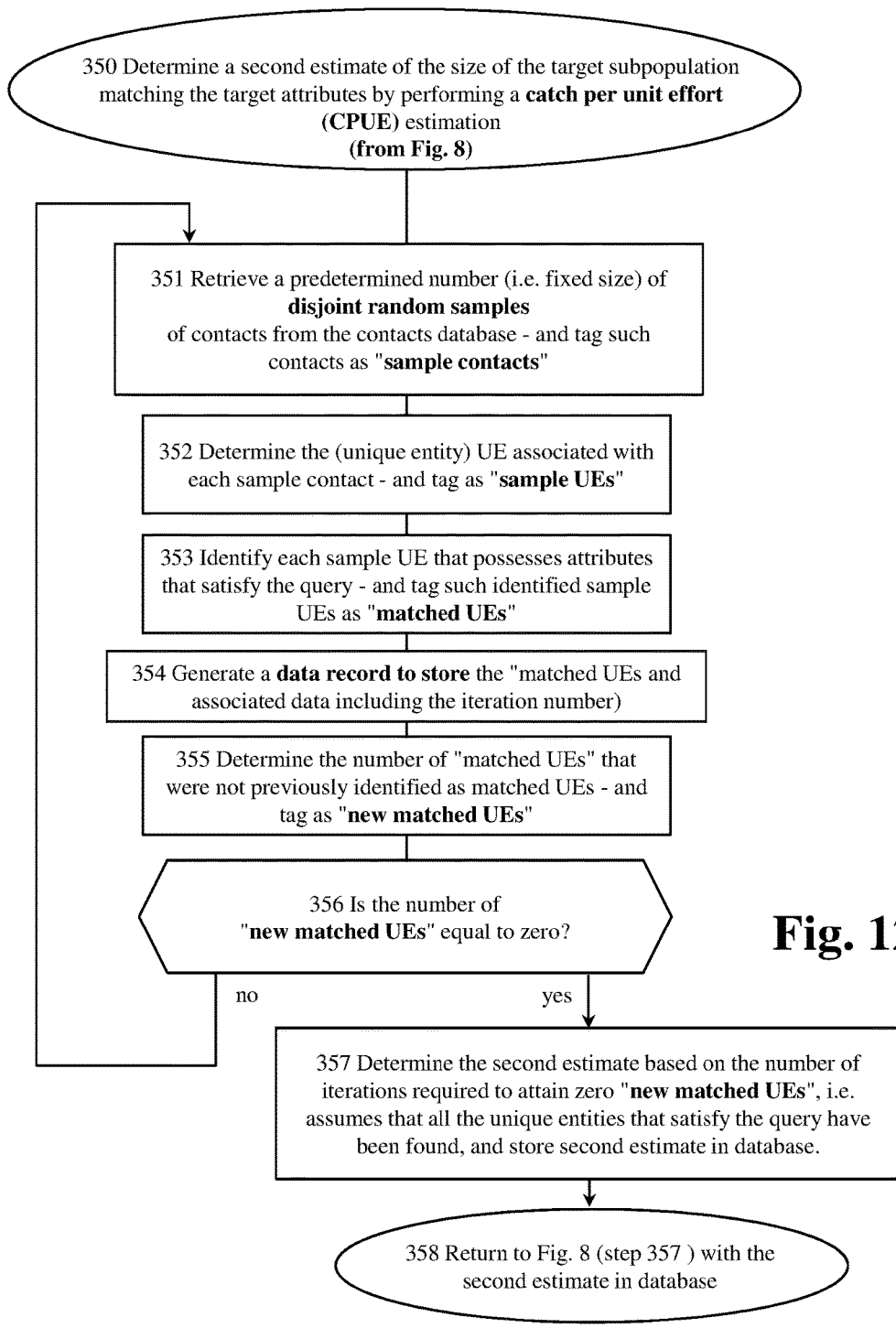
FIG. 12 is a flowchart showing in further detail the "determine a second estimate of the size of the target subpopulation matching the target attributes by performing a catch per unit effort estimation" step of FIG. 8, in accordance with one embodiment of the invention.

The systems and methods of the invention will now be described with reference to FIG. 12. FIG. 12 is a flowchart showing in further detail the "determine a second estimate of the size of the target subpopulation matching the target attributes by performing a catch per unit effort estimation" step 350 of FIG. 8, in accordance with one embodiment of the invention. As shown, the process starts in step 350 and passes to step 351.

In step 351, the system retrieves a predetermined number, i.e. a fixed size, of disjoint random samples. Illustratively, these samples may be secured from the contacts database 232. The system tags such retrieved contacts, i.e. samples, as sample contacts. Then, the process passes to step 352. In step 352, the system determines the unique entity associated with each sample contact. The system then tags these identified unique entities as "sample unique entities". Then, the process passes to step 353.

In step 353, the system identifies each sample unique entity that possesses attributes that satisfy the query. The system then tags such identified sample as "matched unique entities". Then, the process passes to step 354.

In step 354, the system generates a data record in which to store the matched unique entities (as determined in step 353) and to also store associated data related to the matched unique entities. In particular, the SE the system to 10 associates the particular matched unique entities with a particular iteration number, i.e. the iteration count. Then, process passes to step 355.

In step 355, the system utilizes the data stored in step 354 described above. Specifically, in step 355, the system determines the number of matched unique entities that were not previously identified as matched unique entities. These newly identified unique entities are tagged as "new matched unique entities". Then, the process passes to step 356.

In step 356, the system determines whether or not the number of "new matched UEs" (as determined in step 355) is equal to 0. In other words, the system determines if the current iteration has only identified matching samples (to the query) that have been previously identified in previous iterations.

If "no" in step 356, the process then returns to step 351. As described above, the system in step 351, then retrieves an additional fixed size of disjoint random samples. At a point in the processing—an iteration (including step 351 to step 356) will result in the number of "new matched UEs" equal to 0 (zero). Accordingly, the determination in step 356 will be "yes" and the process will pass from step 356 to step 357.

In step 357, the system then determines a second estimate based on the number of iterations required to attain zero "new matched UEs". From such finding of zero "new matched UEs"—the system concludes that all unique entities that satisfy the query have been identified. As described in detail above, based on the observed iterations to attain a "0" finding and attributes of such iterations, and estimate of the subpopulation is derived.

After step 357, the process passes to step 358. In step 358, the process returns to FIG. 8—and specifically passes to step 357 of FIG. 8 with second estimate in the database portion 230.

Figure 13:
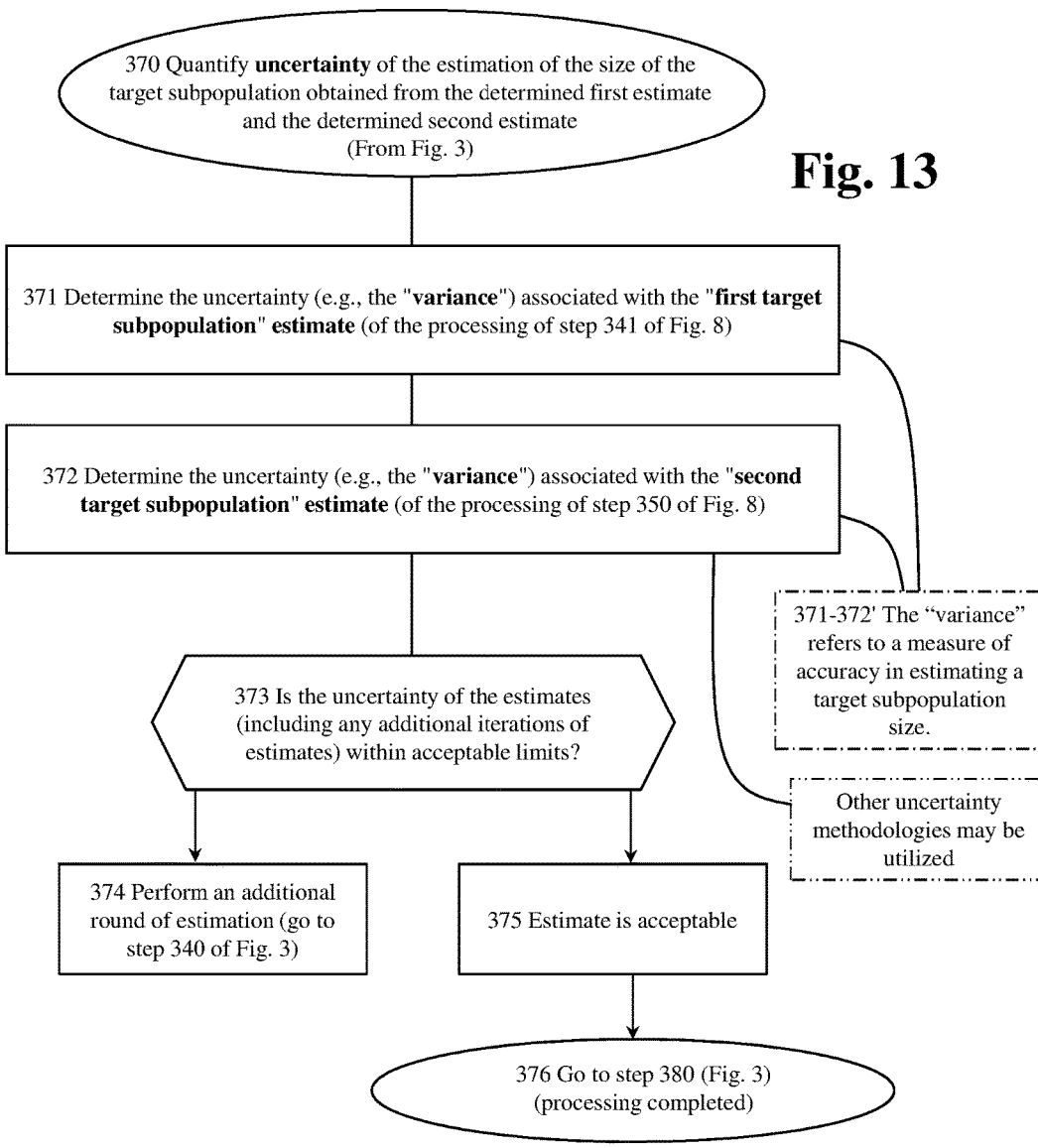
FIG. 13 is a flowchart showing in further detail the "quantify uncertainty of the estimation of the size of the target subpopulation obtained from the determined first estimate and the determined second estimate" step of FIG. 3, in accordance with one embodiment of the invention.

FIG. 13 is a flowchart showing in further detail the "quantify uncertainty of the estimation of the size of the target subpopulation obtained from the determined first estimate and the determined second estimate" step 370 of FIG. 3, in accordance with one embodiment of the invention. As shown, the process starts in step 370 and passes to step 371.

In step 371, the SE system 210 determines the uncertainty associated with the "first target subpopulation" estimate. Specifically, such estimate is the estimate generated in the processing of step 341 a FIG. 8. In accordance with embodiments of the invention, this uncertainty is assessed through determination of the "variance" associated with the estimate as is described above. As reflected in box 371-372' (FIG. 13) the "variance" refers to a measure of accuracy in estimating a target subpopulation size. After step 371, the process passes to step 372.

In step 372, the SE system 210 determines the uncertainty associated with the "second target subpopulation" estimate. Specifically, such estimate is the estimate generated in the processing of step 350 FIG. 8. In accordance with embodiments of the invention, this uncertainty is assessed through determination of the "variance" associated with the estimate as is described above.

Then, the process passes to step 373. In step 373, the system determines whether the uncertainty of the estimates (including any additional iterations of estimates) are within acceptable limits. If "no" in step 373, processing passes to step 374. In step 374, the system performs an additional round of estimation. Such additional estimation processing is performed by returning to step 340 of FIG. 3. Processing then advances as described above.

On the other hand, it may be the case that in step 373—the uncertainty of the estimates is within acceptable limits. As a result, the process passes to step 375, which reflects that the estimate is acceptable. Thereafter, the process passes to step 376. In step 376, the process returns to FIG. 3—and specifically passes to step 380 of FIG. 3 reflecting that processing for the particular query is concluded.

It is appreciated that features of one embodiment as described herein may be used in conjunction with features of other embodiments, as may be desired.

Hereinafter, further aspects of implementation of the systems and methods of the invention will be described.

As described herein, embodiments of the system of the invention and various processes of embodiments are described. The system of the invention and/or portions of the system of the invention may be in the form of a "processing machine," i.e. a tangibly embodied machine. As used herein, the term "processing machine" is to be understood to include at least one "processor" that uses at least one memory. The processing portion 220, of the SE system 210 as described herein, is in the form of one or more "processors" in accordance with embodiments of the invention. The at least one memory, such as the database portion 230, stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, code or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the machine used to implement the invention may be in the form of a processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention on the processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

A suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

The foregoing examples have been provided merely for the purpose of explanation and are in no way to be construed as limiting of the computer implemented method and the subpopulation size estimation and uncertainty quantification system (SE system) disclosed herein. While the computer implemented method and the SE system have been described with reference to various embodiments, it is understood that the words, which have been used herein, are words of description and illustration, rather than words of limitation. Further, although the computer implemented method and the SE system have been described herein with reference to particular means, materials, and embodiments, the computer implemented method and the SE system are not intended to be limited to the particulars disclosed herein; rather, the computer implemented method and the SE system extend to all functionally equivalent structures, methods and uses, such as are within the scope of the appended claims. Those skilled in the art, having the benefit of the teachings of this specification, may effect numerous modifications thereto and changes may be made without departing from the scope and spirit of the computer implemented method and the SE system in their aspects.

Accordingly, it will be readily understood by those persons skilled in the art that the present invention is susceptible to broad utility and application. As noted above, many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A computer implemented method for estimating a size of a target subpopulation and quantifying size estimation uncertainty, said method employing a subpopulation size estimation and uncertainty quantification system comprising at least one processor configured to execute computer program instructions for performing said method, said method comprising:
   constructing an entity database comprising unique entities from a contact database by said subpopulation size estimation and uncertainty quantification system, wherein said entity database defines a mapping between each of said unique entities and one or more of a plurality of contacts retrieved from said contact database;

receiving a query defining target attributes of entities of said target subpopulation from a user device by said subpopulation size estimation and uncertainty quantification system;

estimating said size of said target subpopulation delimited by said received query by performing:

determining a first estimate of said size of said target subpopulation matching said target attributes by said subpopulation size estimation and uncertainty quantification system by performing a mark and recapture estimation using a first predetermined number of disjoint random samples of said contacts from said contact database and their corresponding unique entities from said entity database; and determining a second estimate of said size of said target subpopulation matching said target attributes by said subpopulation size estimation and uncertainty quantification system by performing a catch per unit effort estimation using a second predetermined number of disjoint random samples of said contacts from said contact database and their corresponding unique entities from said entity database; and quantifying uncertainty of said estimation of said size of said target subpopulation obtained from said determined first estimate and said determined second estimate by said subpopulation size estimation and uncertainty quantification system.

2. The computer implemented method of claim 1, wherein said quantification of said uncertainty of said estimation of said size of said target subpopulation comprises:

determining a first variance of said determined first estimate by said subpopulation size estimation and uncertainty quantification system;

determining a second variance of said determined second estimate by said subpopulation size estimation and uncertainty quantification system; and iteratively performing said determination of said first estimate of said size of said target subpopulation and said determination of said second estimate of said size of said target subpopulation and computing a weighted average of said first estimate and said second estimate by said subpopulation size estimation and uncertainty quantification system to reduce one of said first variance and said second variance, if said one of said first variance and said second variance is substantially large.

3. The computer implemented method of claim 2, further comprising increasing said predetermined number of said disjoint samples of said contacts used for said determination of said second estimate by said subpopulation size estimation and uncertainty quantification system to reduce said second variance.

4. The computer implemented method of claim 1, further comprising generating confidence intervals of said determined second estimate by said subpopulation size estimation and uncertainty quantification system using said determined second variance of said determined second estimate.

5. The computer implemented method of claim 1, further comprising augmenting said each of said unique entities in said entity database with additional information from supplementary data sources by said subpopulation size estimation and uncertainty quantification system.

6. The computer implemented method of claim 1, wherein said quantification of said uncertainty of said estimation of said size of said target subpopulation comprises:

determining a first variance of said determined first estimate by said subpopulation size estimation and uncertainty quantification system; and determining a second variance of said determined second estimate by said subpopulation size estimation and uncertainty quantification system.

7. The computer implemented method of claim 1, wherein said quantification of said uncertainty of said estimation of said size of said target subpopulation comprises:

determining a first variance of said determined first estimate by said subpopulation size estimation and uncertainty quantification system.

8. The computer implemented method of claim 1, wherein said quantification of said uncertainty of said estimation of said size of said target subpopulation comprises:

determining a variance of said determined second estimate by said subpopulation size estimation and uncertainty quantification system.

9. The computer implemented method of claim 1, wherein said quantification of said uncertainty of said estimation of said size of said target subpopulation comprises:

iteratively performing said determination of said first estimate of said size of said target subpopulation and said determination of said second estimate of said size of said target subpopulation and computing a weighted average of said first estimate and said second estimate by said subpopulation size estimation and uncertainty quantification system to reduce one of said first variance and said second variance, if said one of said first variance and said second variance is substantially large.

10. The computer implemented method of claim 1, wherein said quantification of said uncertainty of said estimation of said size of said target subpopulation comprises:

iteratively performing said determination of said first estimate of said size of said target subpopulation and said determination of said second estimate of said size of said target subpopulation and computing a weighted average of said first estimate and said second estimate by said subpopulation size estimation and uncertainty quantification system.

11. The computer implemented method of claim 1, further including said subpopulation size estimation and uncertainty quantification system:

interfacing over a network with a user device, via a user interface, the interfacing including:

presenting system data to the user including a selection option;

sensing a selection in response to the selection option;

controlling operation of the subpopulation size estimation and uncertainty quantification system based on the selection.

12. The computer implemented method of claim 11, the controlling operation including the subpopulation size estimation and uncertainty quantification system varying a population to which the query is applied.

13. The computer implemented method of claim 11, the controlling operation including the subpopulation size estimation and uncertainty quantification system adjusting attributes associated with the query.

14. The computer implemented method of claim 11, the controlling operation including the subpopulation size estimation and uncertainty quantification system adjusting the target attributes associated with the query.

15. The computer implemented method of claim 11, the controlling operation including the subpopulation size estimation and uncertainty quantification system performing processing to increase a population from which the target subpopulation is drawn.

16. The computer implemented method of claim 11, the controlling operation including augmenting said each of said unique entities in said entity database with additional information from supplementary data sources by said subpopulation size estimation and uncertainty quantification system, and said augmenting based on input from the user device regarding deficiency in an estimate size.

17. The computer implemented method of claim 11, the network is the Internet.

18. A subpopulation size estimation and uncertainty quantification system that estimates a size of a target subpopulation and quantifies size estimation uncertainty, said subpopulation size estimation and uncertainty quantification system comprising a processor configured to execute computer program instructions in a database portion, the subpopulation size estimation and uncertainty quantification system comprising:
  the database portion; and
  the processor, the processor performing processing including:
    constructing an entity database comprising unique entities from a contact database, wherein said entity database defines a mapping between each of said unique entities and one or more of a plurality of contacts retrieved from said contact database;
    receiving a query defining target attributes of entities of said target subpopulation from a user device;
    estimating said size of said target subpopulation delimited by said received query by performing:
      determining a first estimate of said size of said target subpopulation matching said target attributes by performing a mark and recapture estimation using a first predetermined number of disjoint random samples of said contacts from said contact database and their corresponding unique entities from said entity database; and
      determining a second estimate of said size of said target subpopulation matching said target attributes by performing a catch per unit effort estimation using a second predetermined number of disjoint random samples of said contacts from said contact database and their corresponding unique entities from said entity database; and
    quantifying uncertainty of said estimation of said size of said target subpopulation obtained from said determined first estimate and said determined second estimate.

19. The subpopulation size estimation and uncertainty quantification system of claim 18, further including said subpopulation size estimation and uncertainty quantification system:
  interfacing over a network with a user device, via a user interface, the interfacing including:
    presenting system data to the user including a selection option;
    sensing a selection in response to the selection option;
    controlling operation of the subpopulation size estimation and uncertainty quantification system based on the selection.

\* \* \* \* \*